(12) United States Patent
Jackson et al.

(10) Patent No.: US 9,223,807 B2
(45) Date of Patent: Dec. 29, 2015

(54) ROLE-ORIENTED DATABASE RECORD FIELD SECURITY MODEL

(75) Inventors: Geoffrey George Jackson, San Jose, CA (US); Jay Merrill Bruce, San Jose, CA (US); Pamela J. Van Orden, legal representative, Cupertino, CA (US); Falk Reichbott, Meerane (DE)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/615,233

(22) Filed: Sep. 13, 2012

(65) Prior Publication Data

US 2014/0075571 A1    Mar. 13, 2014

(51) Int. Cl.
*G06F 17/30* (2006.01)
*G06F 21/62* (2013.01)
*G06F 21/60* (2013.01)

(52) U.S. Cl.
CPC ........ *G06F 17/30292* (2013.01); *G06F 21/604* (2013.01); *G06F 21/62* (2013.01); *G06F 21/6227* (2013.01)

(58) Field of Classification Search
CPC ... G06F 21/6227; G06F 21/62; G06F 21/604; G06F 17/30292
See application file for complete search history.

(56) References Cited

U.S. PATENT DOCUMENTS

| 7,111,005 | B1* | 9/2006 | Wessman | 1/1 |
| 8,055,678 | B2 | 11/2011 | Kim et al. | |
| 2002/0066038 | A1* | 5/2002 | Mattsson et al. | 713/202 |
| 2003/0046572 | A1 | 3/2003 | Newman et al. | |
| 2005/0257197 | A1* | 11/2005 | Herter et al. | 717/116 |
| 2006/0053112 | A1* | 3/2006 | Chitkara et al. | 707/9 |
| 2006/0248599 | A1* | 11/2006 | Sack et al. | 726/27 |
| 2008/0082834 | A1 | 4/2008 | Mattsson | |
| 2010/0192208 | A1* | 7/2010 | Mattsson | 726/6 |

OTHER PUBLICATIONS

Langford, J. "Implementing Least Privilege at your Enterprise," SANS Insitute InfoSec Reading Room, Jul. 5, 2003, 22 pages.*

* cited by examiner

*Primary Examiner* — Robert Leung
(74) *Attorney, Agent, or Firm* — Jeffrey S. LaBaw; David H. Judson

(57) ABSTRACT

A database management system implements a role-oriented authorization scheme that facilitates operating system (OS) supported encrypted field access for a table in the database. A security model provides for various roles that have varying responsibilities and rights with respect to the database tables and the data supported therein. In this approach, data that is considered sensitive is encrypted. A system administrator role is authorized to create, update, and maintain a table but is not authorized to view sensitive field data, i.e., data stored in encrypted columns of the table. A security administrator role is authorized to define column masks with OS-enforced security access control to the sensitive field data. By separating (fencing) these responsibilities, the security model enforces end-to-end encryption across the entire database management system.

25 Claims, 4 Drawing Sheets

ROLE-ORIENTED DATABASE RECORD FIELD SECURITY MODEL

BACKGROUND OF THE INVENTION

1. Technical Field

This disclosure relates generally to securing resources in a distributed computing environment, such as a transaction processing environment.

2. Background of the Related Art

Security systems associated with complex, multi-component computing environments are designed to permit selective and controlled access by active entities (such as users) to static entities (such as data sources).

A representative multi-component system of this type, wherein components work together cooperatively to form a larger system, is the IBM® HyperText Transfer Protocol (HTTP) and Web Services processing environment, which may be implemented using IBM mainframe computers, such as the IBM z196 family of computing machines. This environment typically includes IBM's WebSphere® Application Server (WAS) middleware platform software product, working in conjunction with one or more transaction processing products, such as IBM Customer Information Control System (CICS®) and/or IBM Information Management System (IMS), a message processing product, such as IBM WebSphere MQ, and a relational database, such as the IBM DB2® database. An objective of a multi-component environment is to provide a high performance transaction processing computing system or environment accessible to client end-users via Internet browsers using HTTP or other Web Services. In this environment, the client end-user making the HTTP or Web Services request communicates directly with the application server. Typically, to fulfill the transaction request from the distributed client end-user, the application server invokes the services of one or more other components in the environment. One of more of these components typically execute on an operating system, such as IBM z/OS® operating system, which is often referred to as a "mainframe" operating system platform.

In such an environment, the transaction processing, messaging, and database components typically are executing within a mainframe computer that includes a framework for managing security within the environment. The framework includes a security server. In a representative z/OS implementation, the security framework is provided by z/OS Security Server, which includes the IBM Resource Access Control Facility (RACF®) as its security engine. RACF allows an administrator to set rules for controlling access to resources by defining what is protected at what level and determining who can access protected resources. In a typical mainframe operating environment (e.g., z/OS), RACF is used to identify and verify users' authority to access data and to use system facilities.

The above-described products and technologies expose interfaces that can be used by permitted entities, such as system administrators, to monitor and manage resources that are being protected by the system.

In addition, relational database technologies such as described above support various encryption methods for data stored in the database tables. Thus, for example, IBM InfoSphere® Guardium® Data Encryption for DB2 and IMS Databases implement EDITPROC security, which uses an Integrated Cryptographic Services Facility (ICSF) to provide encryption at the table level of the database. Consequently, all application users, developers and DB2 system administrators (SYSADMs) can access sensitive data if they have DB2 security and RACF access to the table granted by the SYSADM. This facility, however, does not provide any masking of sensitive data. Alternatively, DB2 includes built-in encryption security, which uses ICSF and is implemented at the column level of the database. This approach, however, requires extensive application changes, and passwords have to be defined and maintained by the application owner's independently of the SYSADMs. Further, passwords have to be defined and used by applications to access data, and no masking of sensitive data is provided. Another known approach is to use an encryption method that uses a User Defined Function (UDF) to afford application users access to sensitive data, although no masking of sensitive data is provided in this approach either.

Currently, however, there are no clearly-defined lines between the roles needed to implement and use cryptographic technology in relational databases such as DB2 z. The lack of well-defined roles and a comprehensive security model causes administrative confusion. It is desirable to provide a more comprehensive security model that may be enforced across the entire relational database management system. This disclosure addresses this need.

BRIEF SUMMARY

According to this disclosure, a relational database management system is enhanced by provided a role-oriented authorization scheme that facilitates operating system (OS) supported encrypted field access for a table in the database. To this end, a method for handling database record field security provides for various roles that have varying responsibilities and rights with respect to the database tables and the data supported therein. In this approach, data that is considered sensitive (so-called sensitive data) is encrypted. In particular, field (column) data is encrypted such that the database table includes encrypted columns. A first role, typically a system administrator (SYSADM in DB2 z), is authorized to create, update, and maintain a table but is not authorized to view sensitive field data, i.e., data stored in encrypted columns of the table. A second role, typically a security administrator (SECADM in DB2 z), is authorized to define column masks with OS-enforced security access control to the sensitive field data. In DB2, for example, the OS in an MVS OS, and the access control is a resource access control facility (RACF).

By separating (fencing) these responsibilities, the security model enforces end-to-end encryption across the entire database management system. System administrators are responsible for creating, updating, and maintaining the database tables only, but their role is fenced off from being able to view sensitive column data. Security administrators, on the other hand, are responsible for creating, updating and maintaining access control definitions and column masks, but they are excluded from table access and application functions that may be performed by the system administrators.

The security model also may include one or more other roles, such as an auditor role, a role that may be called upon to verify the access granted to all users by a security administrator. An auditor, however, is authorized to use security access controls to view encrypted columns, but only in a masked format. Another role in the security role is a first application user role, which is a role by which application users are authorized to access and/or update sensitive column data. A second application user role is a role by which an application user is authorized to access only masked sensitive column data. A privileged application user, however, is authorized to set up, maintain and grant access authority to the encrypted columns. Another possible role in the security model is an application developer role, which is a role that is authorized to access only masked sensitive column data. Application developers are thus authorized to access the table, but not the encrypted columns.

Preferably, each role in the security model has unique responsibilities and is distinct (fenced off) from any other role.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
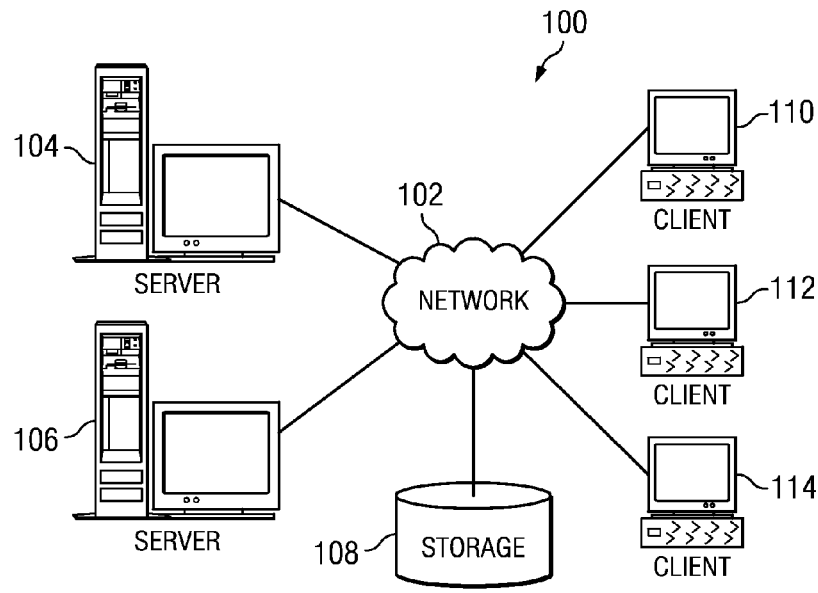
FIG. 1 depicts an exemplary block diagram of a distributed data processing environment in which exemplary aspects of the illustrative embodiments may be implemented.
Figure 2:
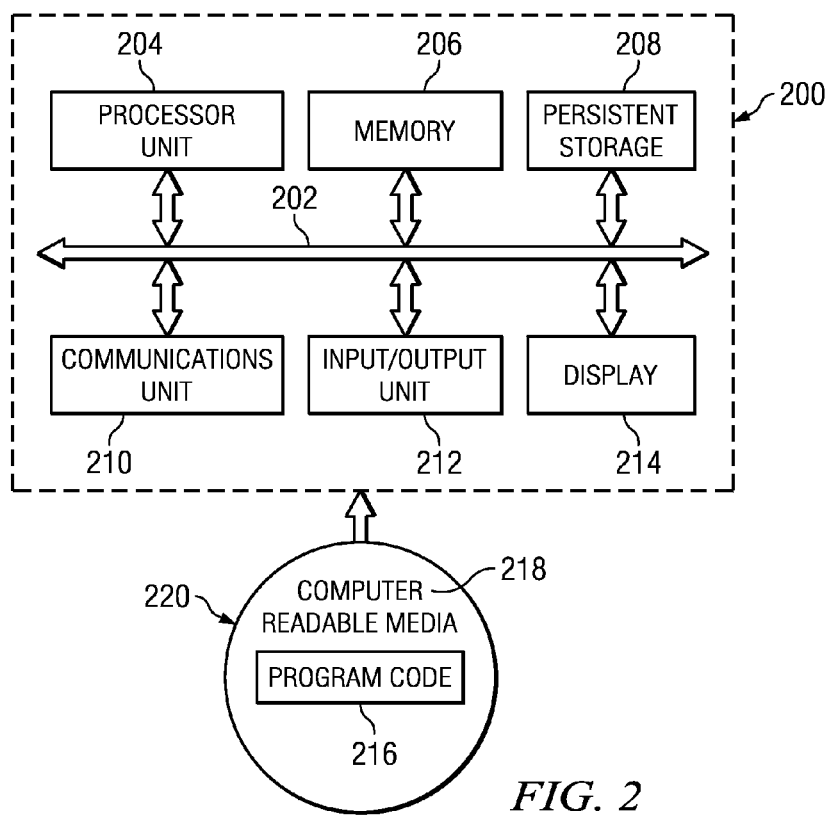
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Figure 3:
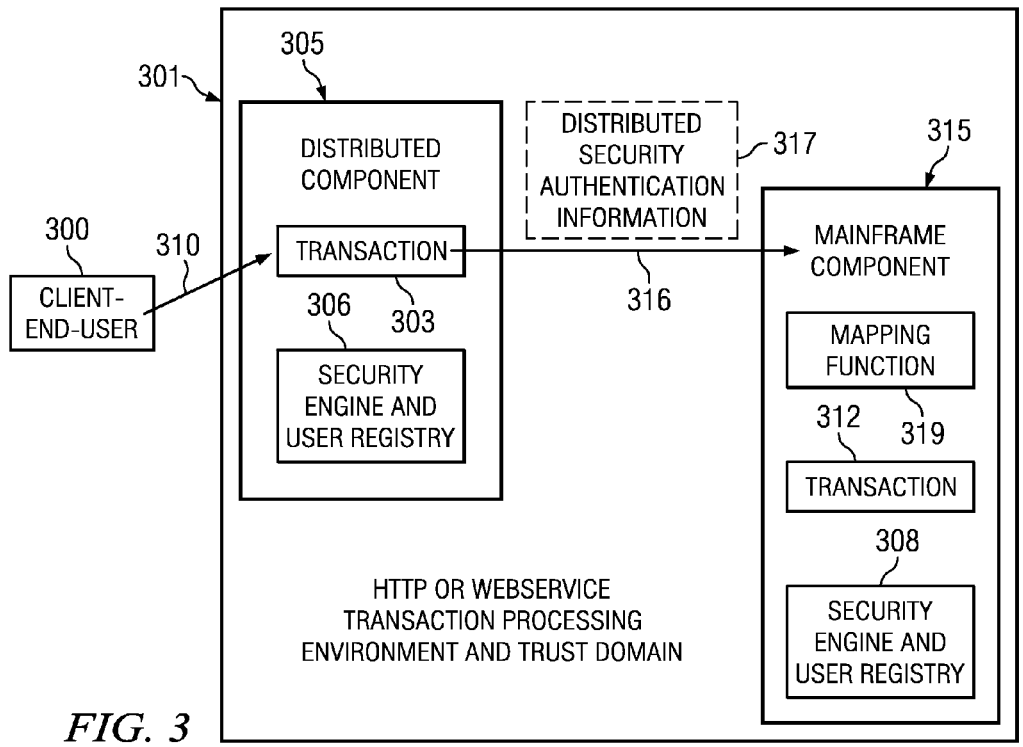
FIG. 3 depicts one implementation of a multiple component transaction processing environment including both distributed and mainframe computing components and in which the subject matter of this disclosure may be implemented.

One particular embodiment of a multi-component computing environment in which the subject matter herein may be implemented is shown in FIG. 3. This environment includes an initial authentication component 305 and a subsequent mainframe processing component 315. Each component includes its own security engine and user registry 306, 308. A user registry (also referred to herein as a local user registry or security registry) contains information on users having access to the respective component, such as user IDs and passwords. In one example, the initial authentication component may be a WebSphere Application Server (WAS), running on a Linux operating system, running within a Logical Partition (LPAR) within a z196 computer (offered commercially by IBM) and the subsequent processing component may be an implementation of Customer Information Control System (CICS), which is also offered by IBM, running within a mainframe operating system (such as IBM z/OS operating system), executing on the same or perhaps a different z196 computer.

The initial authentication server includes an identification and authentication component or service to identify and authenticate a client end-user 300 making a request 310. In one embodiment, identification and authentication is accomplished by way of the operating system, for instance, implementing an appropriate pluggable authentication module in a Linux environment. In another embodiment, the client end-user identification and authentication is accomplished by client-authenticated SSL in which the client-end-user has a digital certificate signed by a certificate authority that is trusted by the authenticating distributed component.

A trust relationship is established between the initial authentication component and the security engine of the subsequent processing component. The trust relationship is based on the secure exchange of a secret cryptographic data signature key that is used to validate distributed client-end-user identities and other information transferred within the distributed security information transaction processing message part. The actual secure exchange may be accomplished by multiple known methods.

Typically, the initial authentication component acquires a digital certificate as part of its installation processing, using for example the Simple Certificate Enrollment Protocol (SCEP), which is supported by the Public Key Infrastructure function within the IBM z/OS operating system. As part of its initialization processing, the initial authentication component 305 establishes a client authenticated SSL session with the mainframe security engine 308 of the mainframe component 315 of the transaction-processing environment. During this "initialization session," the initial authentication component will "register" itself as a user with the mainframe security engine and have its credentials, including the shared secret data signature key, recorded within the mainframe security engine (e.g., RACF) user registry of the mainframe security engine within the "key rings" that the mainframe security engine retains for selected users, thus establishing the trust relationship.

This trust relationship means that among security user identification and authentication services used by the distributed and mainframe components, a user identification and authentication performed within one component is understood and trusted by another component within the multi-component transaction processing environment. This security trust relationship is also referred to herein as a trust domain, with domain 301 being one example. Trust domain 301 is established to include initial authentication component 305, and at least one subsequent processing component 315. In operation, transaction 303 running within the distributed component 305 of the multi-component transaction processing environment 301, as part of its processing, initiates a subsequent transaction request 316 to the mainframe component of the same environment. Distributed component 305 includes distributed security authentication information 317, in the transaction request message flow to mainframe component 315.

Mainframe component 315 receives distributed security authentication information 317, along with subsequent transaction request 316, and utilizes an installation administratively defined mapping function 319 to determine what local mainframe component user identity with which to execute subsequent transaction 312. The mapping function utilized may be a simple programming coded table associating a given distributed client end-user with a specific mainframe user identity, or it may be a more administratively friendly and functional program product, such as the IBM Enterprise Identity Mapping (EIM) product.

While the disclosed subject matter is not limited to implementation within any particular database management system, the following provides additional background regarding DB2. DB2 database manager level authorities define the grouping of privileges and control over maintenance, execution of database manager utilities, and data access. These authorities are associated with group membership, and the group names that are associated with the authority levels are stored in the database manager configuration file for a specific instance. However, database level authorities are a set of privileges associated with a specific database and database objects within the DB2 instance. These authorities are stored in the database system catalog tables.

DB2 defines different hierarchal levels of authorities, SYSADM, SYSCTRL, SYSMAINT, SYSMON, SECADM, and DBADM, each with the ability to perform a subset of administrative operations such as creating of a database, creating database backups, and retrieving data. The first four authorization levels operate on the instance level and have system-wide scope authority. Each of these authorities is associated with a specific DB2 instance level parameter that controls which users receive that authority. Both the DBADM and SECADM authorities are associated with a specific database managed by the DB2 database system.

System administrator (SYSADM) is the highest level of authority in DB2 that can be granted to a group. SYSADM authority is assigned to a group name designated by the SYSADM_GROUP database manager configuration parameter. Membership in that group is controlled by an external security facility installed on the operating system of the database server. The database manager interacts with this facility through a security plug-in. Members of the group with SYSADM authority can perform the following tasks: migrate databases, modify the database manager configuration and database configuration files, safeguard the data by performing database and log file backups, and perform restoration of databases and database objects such as table spaces, and grant and revoke other authorities and privileges to and from users, groups, or roles, for example, SYSCTRL, SYSMAINT, SYSMON, DBADM, and SECADM.

Beginning with IBM DB2 Version 9.1, DB2 has been extended to include several security capabilities including the security administrator authority level (SECADM). The SECADM authority applies at the database level and is the only authority that can perform specific database security related actions. The SECADM authority has no inherent privilege to access data stored in tables or any other additional inherent privileges. SECADM authority can only be granted and revoked by a user with SYSADM authority to individual users. With SECADM authority, the user can perform various security-related actions in the database including, without limitation, creating, altering, commenting and dropping audit policies, security label components, security policies, trusted contexts, roles, security labels, and the like.

DB2 uses the security facility of an operating system or a product in the database server to authenticate users. Before DB2 can successfully authenticate a user ID to communicate with the database system, DB2 must successfully interact with the operating system to access the external security facility configured on the machine. DB2 communicates with the security facility installed on the machine by calling certain APIs. To invoke these APIs, a user account with the proper user privileges is required on the operating system by DB2. The user privileges are established during the DB2 installation process.

IBM DB2 Version 9.5 provides new options for tighter security and allows for more granularity and flexibility in administrating the data access. One such option is the database entity called a role. Database roles are groups that are defined and managed by DB2. A database role is a database object that may group together one or more privileges or database authorities, and may be granted to users, groups, PUBLIC, trusted context, or other roles. Roles simplify the administration and management of privileges by offering capabilities similar to groups but without the same restrictions.

More generally, a role is a database object to which one or more DB2 privileges, authorities, or other roles can be granted or revoked. A role does not have an owner, and it can only be created or dropped by the security administrator (SECADM). By associating a role with a user, the user inherits all the privileges held by the role, in addition to privileges already held by the user.

All DB2 privileges and authorities that can be granted within a database, with the exception of SECADM, can be granted to a role. By granting privileges and authorities to roles only and making users members in roles, the administration and management of privileges in the database is greatly simplified.

Role-Oriented Encryption End-to-End Security Model

With the above serving as background, the subject matter of this disclosure is now described. The techniques herein preferably are implemented in a security server operating within a multi-component computing environment such as described above. In a representative embodiment, the security server is z/OS Security Server having support for Resource Access Control Facility (RACF) or its equivalent. As noted above, the techniques described are not limited for use with such particular products.

Figure 4:
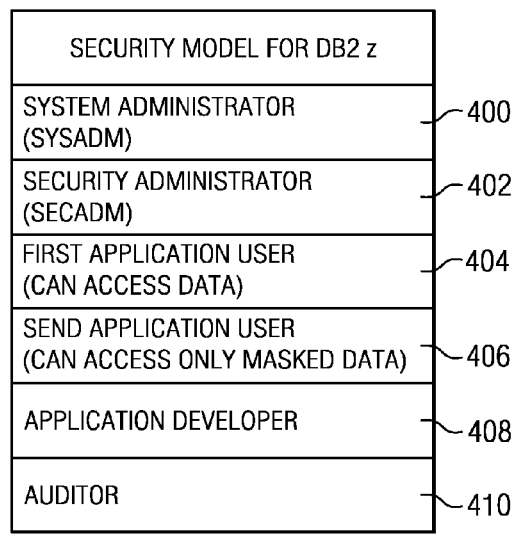
FIG. 4 illustrates a database management system security model according to this disclosure.

According to this disclosure, and as described above, a role-oriented authorization scheme is provided that facilitates operating system (OS)-supported encrypted field access for a table in the database. To this end, this disclosure defines a novel security model that provides for various roles that have varying responsibilities and rights with respect to the database tables and the data supported therein. With reference to FIG. 4, these roles include the following, which preferably are mutually exclusive (fenced off from one another):

"A "system administrator" (DB2 z SYSADM) 400 is responsible for creating, updating and maintaining relational database tables only. Access controls (such as RACF and DB2 z access controls) for these tables are defined by another role, and not the system administrator. As such, the system administrator role cannot view sensitive column data, because RACF and mask security controls are not part of this role."

"A "security administrator" (DB2 z SECADM) 402 is responsible for creating, updating and maintaining OS-enforced access control (e.g., RACF) definitions and column masks. The security administrator, however, is excluded from SYSADM table access and application functions. The security administrator thus is authorized to define column masks with OS-enforced security access to the encrypted columns in a database table."

A first "application user" role 404 is an application user who is authorized to access and/or update sensitive column data. The first application user is sometimes referred to as a privileged application user.

A second "application user" role 406 is more restrictive than the first application user role. This role is for an application user who is authorized to access only masked sensitive column data.

An "application developer" role 408 is a role authorized to access only masked sensitive column data. Thus, an application developer may be authorized to access the database table, but not the encrypted columns therein.

An "auditor" role 410 is a role with independent security access control (e.g. RACF and DB2 z). Auditors would use the security administrator-defined RACF and column mask controls to ensure that they only see encrypted columns in a masked format. An auditor, however, would be able to verify the access granted to all users by the security administrator.

By separating (fencing) these responsibilities, the security model enforces end-to-end encryption across the entire database management system. System administrators 400 are responsible for creating, updating, and maintaining the database tables only, but their role is fenced off from being able to view sensitive column data. Security administrators 402, on the other hand, are responsible for creating, updating and maintaining access control definitions and column masks, but they are excluded from table access and application functions that may be performed by the system administrators. As a concrete example, a DB2 SYSADM would be responsible for creating, updating and maintaining DB2 tables, while the RACF and DB2 z access controls would be defined for the system administrator 400 by the security administrator 402. As described, according to the security model of this disclosure, the system administrator role is fenced off from being able to view sensitive column data, because RACF and mask security controls are part of the security administrator role. In this example scenario, the data in the table is initially encrypted by an update application user driven UDF instead of a SYSADM-controlled load utility. Also, in this approach, because the security administrator is responsible for creating, updating and maintaining RACF definitions and column masks, the SECADM would have to be excluded from SYSADM table access and application functions. This exclusion may be enforced by the SECADM himself or herself, or it may be enforced by the system automatically or programmatically. Continuing with the DB2 z example scenario, applications use the SECADM-defined RACF and column mask controls to ensure that users have the appropriate encrypted column access. No actual application changes are needed to enforce this restriction. For DB2 application development, the SECADM-defined RACF and column mask controls ensure that developers only see encrypted columns in a masked format. Auditors, however, can use the SECADM-defined RACF and column mask controls to ensure that they only see encrypted columns in a masked format but can still verify the users granted access by the SECADM.

Figure 5:
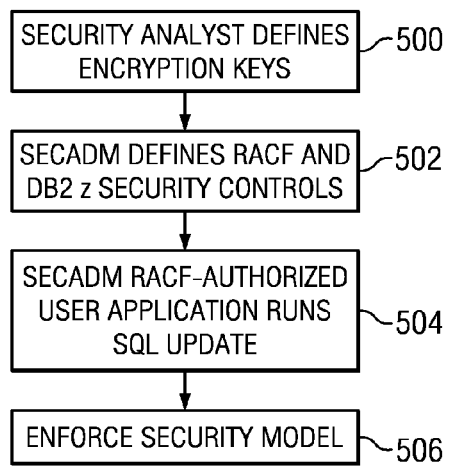
FIG. 5 illustrates a process flow for implementing encrypted column access for one or more database tables in the database management system.

Implementing encryption using these roles in the security model preferably is carried out according to the process flow illustrated in FIG. 5. Using DB2 z as an example scenario, the routine begins at step 500. At this step, a DB2 System z security analyst defines ICSF encryption keys appropriate to the hardware, ICSF technology level, legal or legislative requirements, and industry-driven standards. Key labels that they generate are passed onto SECADM, the DB2 z security administrator. At step 502, the security administrator defines the RACF and DB2 z security controls for all tables. For those tables containing encrypted columns, the security administrator creates appropriate masks for application and development users using the key label provided by the security analyst. At step 504, a SECADM RACF-authorized user application runs a SQL update to encrypt the sensitive data using a UDF. At step 506, the security model is enforced. Thus, all subsequent application, developer and auditor access to the sensitive column would be as per the SECADM-defined RACF and DB2 z security controls and mask definitions.

Figure 6:
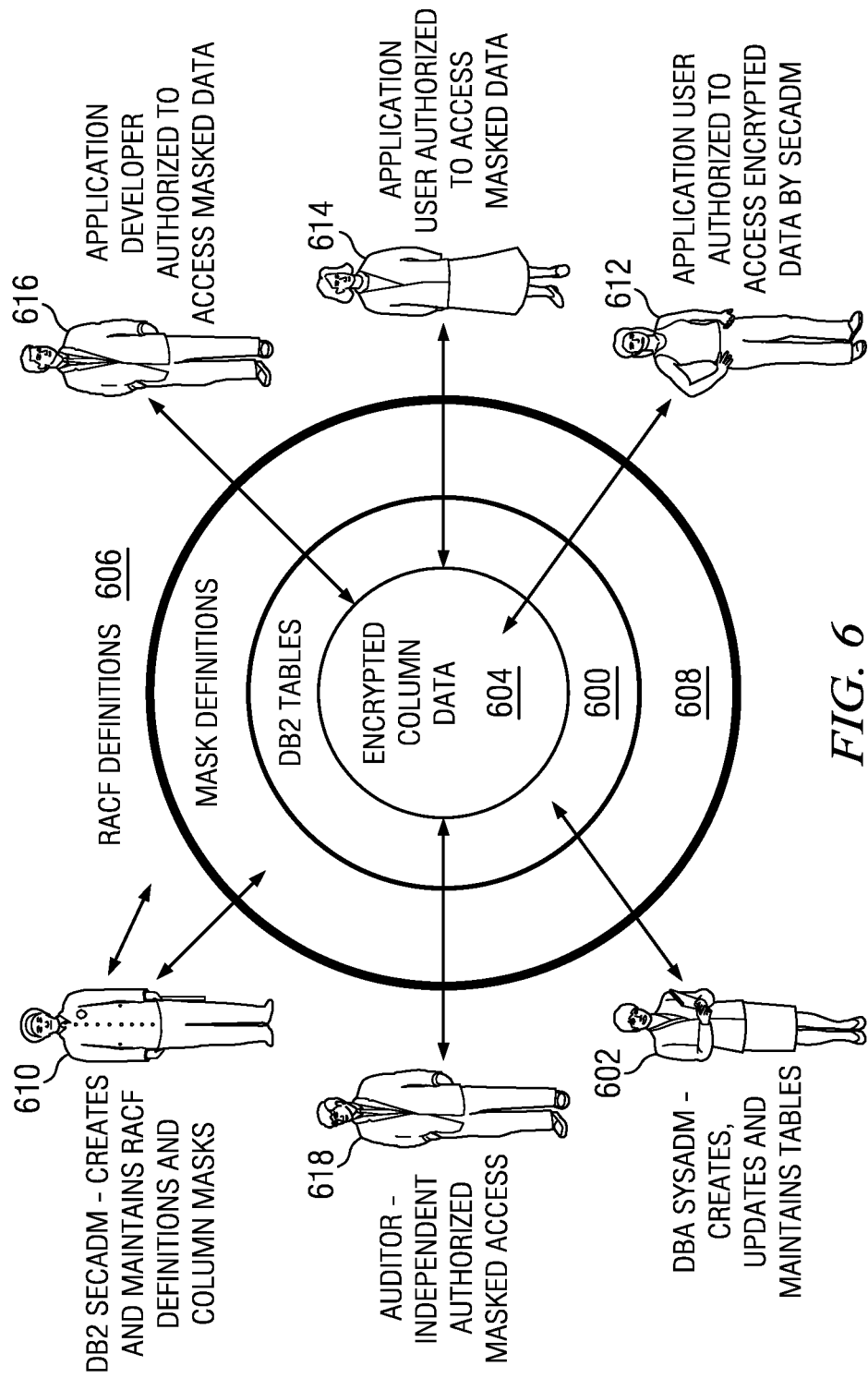
FIG. 6 illustrates the novel security model and the various roles and access rights.

FIG. 6 illustrates the end-to-end security model approach wherein DB2 z encrypted data access controls exploiting a UDF. As illustrated, the DB2 tables 600 are created, updated and maintained by the DB2 SYSADM 602. The DB2 tables 600 include encrypted column data 604, which is created via a UDF. The RACF definitions 606 and mask definitions 608, however, are created and maintained by the DB2 SECADM 610. A user 612 in the first application user role is authorized to access the actual encrypted column data 604. A user 614 in the second application user role, however, is only authorized to access the masked data, as is the application developer 616 in the application developer role. Likewise, an auditor 618 is afforded only authorized masked access, but such authorization may be independent.

Figure 7:
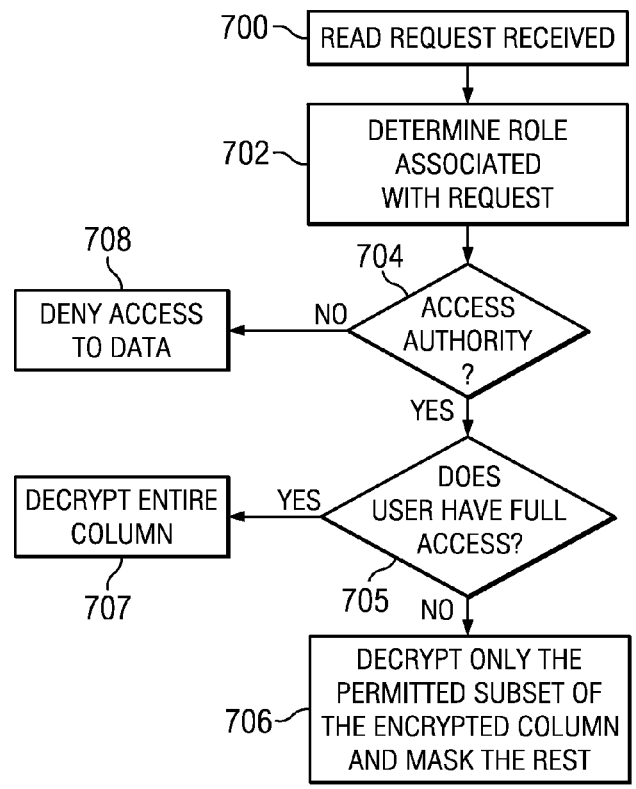
FIG. 7 illustrates a process flow for processing a read request using the security model and the SECADM-defined access controls according to this disclosure.

FIG. 7 illustrates a process flow illustrating how the security model is used to limit read access to encrypted column data. The routine begins at step 700 upon receipt of a read request for reading the encrypted column data. At step 702, the role of the user associated with the read request is determined or ascertained. Steps 700 and 702 may be combined, as the request may identify the user's role. At step 704, a test is made to determine whether the request has been received from a user in a role having authority to access the encrypted column. As noted above, only a user in the first application user role (e.g., user 612 in FIG. 6) is such a user. If the outcome of the test at step 704 indicates that the request is received from a user having authority to access the encrypted column, the routine continues at step 705 to test whether the user has full access. If the outcome of the test at step 705 indicates that the user has full access, the routine continues at step 707 to decrypt the entire column data (e.g., an entire credit card or social security number). Typically, decryption is performed by the OS and, in particular, by a resource access control facility. If the outcome of the test at step 705, however, indicates that the user with access authority does not have full access, the routine continues at step 706 to decrypt only a permitted subset of the encrypted column (e.g., the last four digits of the credit card or social security number) and masking the remainder.

If the outcome of the test at step 704 indicates that the request is received from a user (e.g., user 614, 616 or 618) that does not have authority to access the encrypted column, only masked access is permitted so, in this instance, the routine branches to step 708 to deny access to the actual data. In other words, no decryption is performed. Such users can access the table (and, in particular, the masked data), but not the data itself.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system. In a representative embodiment, the security server components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the avatar framework described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The invention claimed is:

1. A method for enforcing security in a database management system, comprising:
   providing a first role authorized to create, update and maintain a table in a database, the first role being restricted from viewing sensitive field data in the table;
   providing a second role distinct from the first role and authorized to define for the first role at least one operating system-enforced security access control for the table, the second role being restricted from access to the table;
   encrypting at least some data in the table using a function executing on a hardware element of the database management system; and
   enforcing access to the encrypted data based on the first and second roles;
   wherein a role is a database object managed by the database management system and to which at least one database privilege is associated.

2. The method as described in claim 1, further including:
   providing a third role distinct from the first role and the second role, the third role being authorized to access and update the encrypted data in the table; and
   enforcing access to the encrypted data based on the first, second and third roles.

3. The method as described in claim 2, further including:
   providing a fourth role distinct from the first role, the second role, and the third role, the fourth role being authorized to access encrypted data in the table only in masked form; and
   enforcing access to the encrypted data based on the first, second, third and fourth roles.

4. The method as described in claim 3 wherein the fourth role is one of: an application user role, an application developer role, and an auditor role.

5. The method as described in claim 1 wherein the security access control is one of: an operating system-enforced access control, and a column mask.

6. The method as described in claim 1 wherein the database management system includes a relational database.

7. The method as described in claim 6 wherein the first role is SYSADM, and the second role is SECADM.

8. Apparatus, comprising:
   a processor;
   computer memory holding computer program instructions that when executed by the processor perform a method for enforcing security in a database management system using roles, wherein a role is a database object managed by the database management system and to which at least one database privilege is associated, the method comprising:
      providing a first role authorized to create, update and maintain a table in a database, the first role being restricted from viewing sensitive field data in the table;
      providing a second role distinct from the first role and authorized to define for the first role at least one operating system-enforced security access control for the table, the second role being restricted from access to the table;
      encrypting at least some data in the table; and
      enforcing access to the encrypted data based on the first and second roles.

9. The apparatus as described in claim 8, wherein the method further includes:
   providing a third role distinct from the first role and the second role, the third role being authorized to access and update the encrypted data in the table; and
   enforcing access to the encrypted data based on the first, second and third roles.

10. The apparatus as described in claim 9, wherein the method further includes:
    providing a fourth role distinct from the first role, the second role, and the third role, the fourth role being authorized to access encrypted data in the table only in masked form; and
    enforcing access to the encrypted data based on the first, second, third and fourth roles.

11. The apparatus as described in claim 10 wherein the fourth role is one of: an application user role, an application developer role, and an auditor role.

12. The apparatus as described in claim 8 wherein the security access control is one of: an operating system-enforced access control, and a column mask.

13. The apparatus as described in claim 8 wherein the database management system includes a relational database.

14. The apparatus as described in claim 13 wherein the first role is SYSADM, and the second role is SECADM.

15. A computer program product in a non-transitory computer readable medium for use in a data processing system, the computer program product holding computer program instructions which, when executed by the data processing system, perform a method for enforcing security in a database management system, the method comprising:
 providing a first role authorized to create, update and maintain a table in a database, the first role being restricted from viewing sensitive field data in the table;
 providing a second role distinct from the first role and authorized to define for the first role at least one operating system-enforced security access control for the table, the second role being restricted from access to the table;
 encrypting at least some data in the table; and
 enforcing access to the encrypted data based on the first and second roles;
 wherein a role is a database object managed by the database management system and to which at least one database privilege is associated.

16. The computer program product as described in claim 15, wherein the method further includes:
 providing a third role distinct from the first role and the second role, the third role being authorized to access and update the encrypted data in the table; and
 enforcing access to the encrypted data based on the first, second and third roles.

17. The computer program product as described in claim 16, wherein the method further includes:
 providing a fourth role distinct from the first role, the second role, and the third role, the fourth role being authorized to access encrypted data in the table only in masked form; and
 enforcing access to the encrypted data based on the first, second, third and fourth roles.

18. The computer program product as described in claim 17 wherein the fourth role is one of: an application user role, an application developer role, and an auditor role.

19. The computer program product as described in claim 15 wherein the security access control is one of: an operating system-enforced access control, and a column mask.

20. The computer program product as described in claim 15 wherein the database management system includes a relational database.

21. The computer program product as described in claim 20 wherein the first role is SYSADM, and the second role is SECADM.

22. A security server operative in a multi-component computing system that includes a mainframe operating system, comprising:
 a processor;
 computer memory holding computer program instructions executed by the processor for enforcing security in a database management system according to the following operations:
  providing a role-oriented authorization scheme with operating system (OS)-enforced encrypted field access for a table in a database, wherein a role is a database object managed by the database management system and to which at least one database privilege is associated;
  providing a system administrator role authorized to create, update, and maintain the table and not authorized to view encrypted column data in the table;
  providing a security administrator role authorized to define for the system administrator role column masks with OS-enforced security access to the encrypted columns, the system administrator role being restricted from access to the table; and
  responsive to a request, reading encrypted column data.

23. The security server as described in claim 22 further including decrypting the encrypted column data and providing the resulting decrypted data in response to the request if the request is received from an authorized user.

24. The security server as described in claim 22 further including providing the encrypted column data in masked form in response to the request if the request is received from a user that does not have authority to access the encrypted column.

25. The security server as described in claim 22 wherein the multi-component computing system includes a relational database, the system administrator role is SYSADM, the security administrator role is SECADM, and the OS-enforced security access is a resource access control facility.

* * * * *